United States Patent [19]
Williamson

[11] 3,827,517
[45] Aug. 6, 1974

[54] VEHICLE DRIVE STEER WHEEL
[75] Inventor: William A. Williamson, Niles, Mich.
[73] Assignee: Clark Equipment Company, Buchanan, Mich.
[22] Filed: Dec. 7, 1972
[21] Appl. No.: 313,063

[52] U.S. Cl............... 180/6.48, 180/44 F, 180/52, 180/66 R
[51] Int. Cl............................................. B62d 9/00
[58] Field of Search......... 180/6.48, 6.5, 44 F, 66 F, 180/66 R, 52, 51

[56]        References Cited
         UNITED STATES PATENTS
2,284,661   6/1942  Joy..................................... 180/6.5
2,957,533  10/1960  Lewis................................ 180/6.48
3,008,424  11/1961  Roth.................................. 180/66 F
3,489,235   1/1970  Watson............................. 180/6.48

Primary Examiner—David Schonberg
Assistant Examiner—John A. Pekar
Attorney, Agent, or Firm—John C. Wiessler

[57]            ABSTRACT

A dual path hydrostatic drive-steer wheel assembly for vehicles in which a pair of wheels is mounted for dirigible movement from a common rotatable shaft, the wheels being drivable and controllable independently at either the same or different rotative speeds so as to provide vehicle traction drive and to steer the vehicle by causing the wheels to rotate with the common shaft to any selected steering angle.

8 Claims, 3 Drawing Figures

PATENTED AUG 6 1974 3,827,517

VEHICLE DRIVE STEER WHEEL

The field of art to which the invention pertains includes hydrostatic drive-steer wheels.

It is a primary object of the invention to provide a pair of drive-steer wheels having independent traction drive means and being mounted for dirigible movement about a common vertical axis.

Another object is to provide hydrostatic drive means to a pair of spaced wheels of a traction wheel assembly in which the wheels are controllable independently in rotation and are dirigible about a common vertical axis.

Additional objects and advantages of the invention will become apparent to persons skilled in the art in view of the following description taken in conjunction with the drawing, wherein.

Figure 1:
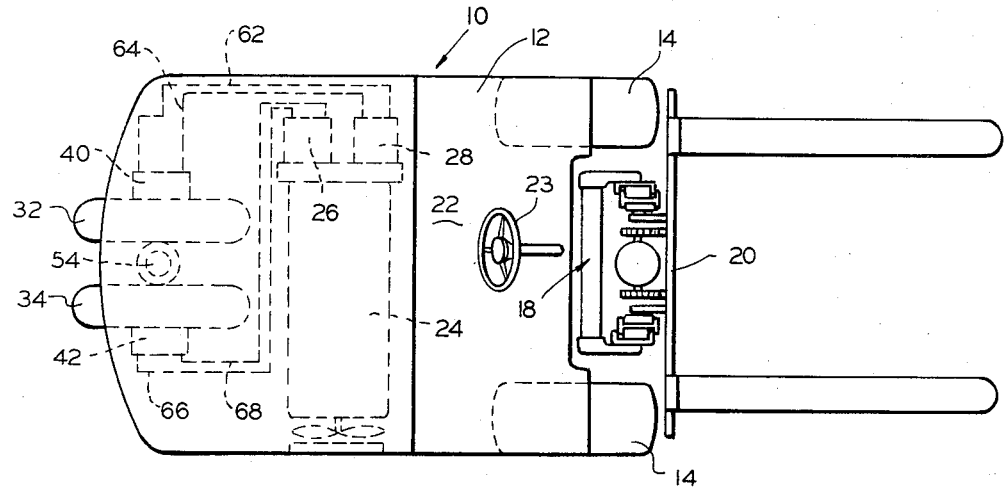
FIG. 1 is a schematized plan view of a lift truck which embodies my invention.
Figure 3:
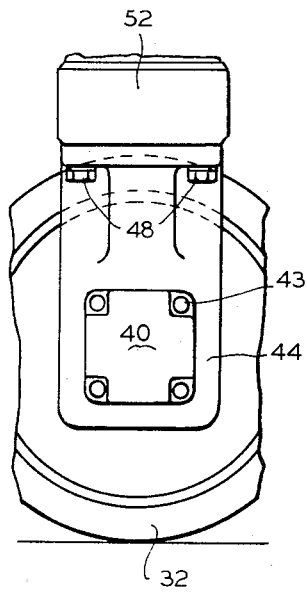
FIG. 3 is a side view in elevation of a portion of FIG. 2.

Although my invention may have application in various types of vehicles in addition to the lift truck of FIG. 1, such as for front drive-steer wheels for a rubber tired compactor, I have chosen to illustrate only the one exemplary embodiment which is entirely adequate to illustrate the principles of the invention.

Figure 2:
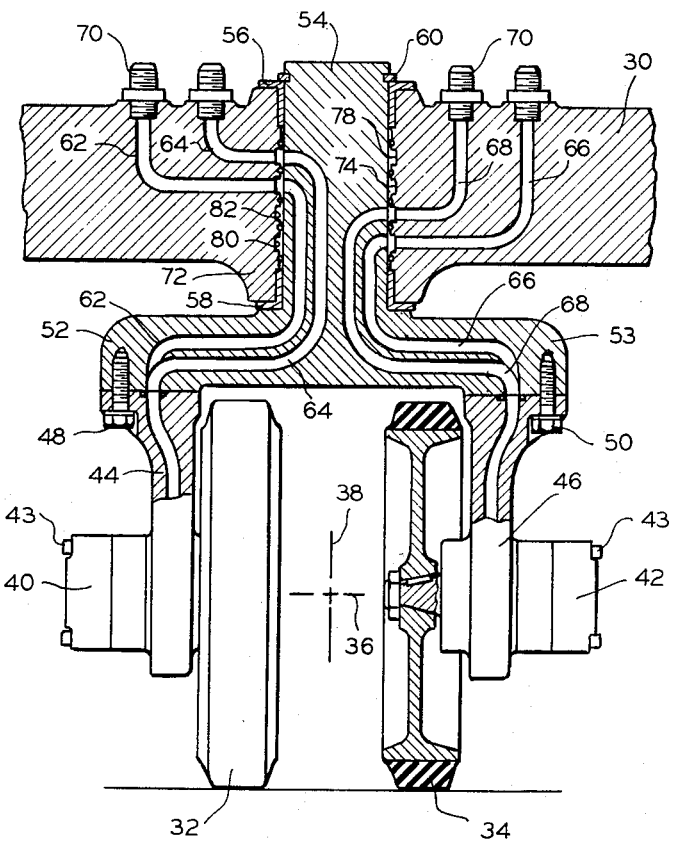
FIG. 2 is an enlarged partial sectional view of my hydrostatic dual wheel assembly.

The lift truck illustrated at numeral 10 includes a chassis 12 mounted at the forward end from a pair of non-dirigible, non-traction wheels 14, and at the rear end from a dual hydrostatic wheel assembly shown generally at numeral 16. From the front end of the truck is mounted a conventional mast assembly 18 having a fork carriage 20 mounted for elevation thereon. An operator's compartment 22 is located for sit down rider control, but the instrumentation and controls are not illustrated except a steering wheel 23. An engine 24 is located generally centrally of the truck and extends transversely thereof, being adapted to drive a pair of hydraulic pumps 26 and 28 which may be of the variable displacement type and which are hydraulically connected to drive hydrostatic wheels 32 and 34 mounted from a transverse truck frame member 30 (FIG. 2).

The dual wheel assembly includes the transversely spaced wheels 32 and 34 which are mounted for traction drive in forward or reverse about a common axis 36 and for dirigible movement right or left about a common axis 38. The wheels are adapted to be driven by hydraulic drive motors 40 and 42 which are mounted by bolts 43 to a pair of spaced downwardly extending support arms 44 and 46 which are mounted by a plurality of bolts 48 and 50 from the terminal ends of a pair of oppositely extending arms 52 and 53. As shown arms 52 and 53 are integral with a rotatable supporting shaft 54 mounted for rotation in bearings 56 and 58 of frame member 30. Shaft 54, extending arms 52 and 53, and support arms 44 and 46 together comprise a supporting yoke of the wheels 32 and 34 and the motors 40 and 42. A ring member 60 supports the entire dual wheel assembly vertically from bearing 56.

As shown, a pair of hydraulic conduits 62 and 64 are formed in frame member 30, in one side portion of the shaft 54, and in yoke arms 52 and 44 for connection to motor 40. A second pair of conduits 66 and 68 are formed in the frame member 30, in the opposite side portion of the shaft and in yoke arms 53, 46 for connection to motor 42. Suitable connections may be made at a plurality of conduit fittings 70 to connect the various conduits to the respective drive pumps, as shown in FIG. 1.

Frame member 30 includes a cylindrical central portion 72 in which bearings 56 and 58 are mounted and which have formed in the interior cylindrical wall thereof a pair of circular grooves 74 and 78 in registry with conduits 62 and 64, respectively, and a second pair of circular grooves 80 and 82 in registry with conduits 66 and 68, respectively, each of the grooves being hydraulically separated from the others by a plurality of O-ring seals, as illustrated. The arrangement provides continuous communication throughout each of the various conduits 62, 64, 66 and 68 regardless of the rotative position of shaft 54, without affecting the relatively fixed position of any part of any such conduit.

The drive pumps 26 and 28 are preferably of a variable displacement type, such as a swash plate type, preferably controlled by a suitable servo motor and feedback follow-up control circuit, not a part of this invention and therefore not shown, as a function of the operator's steering wheel angle. In a straight-ahead steering position the pumps 26 and 28, which are driven at operator selected speeds by engine 24, are operating with the respective swash plates adjusted to the same displacement angle so that the pumps drive motors 40 and 42 independently at the same rotational speeds whereby zero turning torque is generated about axis 38 of shaft 54 and the truck proceeds in a straight line. An operator's transmission control lever may be provided in the usual manner to reverse the swash plate angle of the pumps for reverse drive of the truck. A suitable pump for the purpose contemplated is manufactured by Vickers, a Division of Sperry Rand Corporation of Troy, Mich., Model TA–6.

In the fluid circuit disclosed, forward truck drive is assumed to be with the transmission fluid circulating from the pumps through conduits 62 and 66 to motors 40 and 42, respectively; return fluid is directed back to the pump inlets through conduits 64 and 68. The contrary is true in reverse drive wherein the transmission fluid drives the motors by way of conduits 64 and 68.

Now assume that the vehicle is being operated straight-ahead at a given speed in a forward direction, as above-explained, and that the steering wheel 23 is rotated clockwise, as seen in FIG. 1, for a right-hand turn which will require counterclockwise movement of the wheels 32 and 34 about axis 38. The steering wheel is suitably operatively connected to the displacement controls of the pump swash plates so that the displacement of pump 28 is reduced as direct function of the steering wheel turn angle, thereby resulting in a reduction in rotative speed of wheel 32. The resulting differential rotative speed between wheels 32 and 34 produces a turning torque about axis 38 which effect dirigible movement of the entire wheel assembly as aforesaid which causes the vehicle to turn to the right. Reversal of the steering angle of steering wheel 23 will, of course, effect an opposite differential wheel speed as wheel motor 42 is slowed in relation to motor 40, thereby effecting a clockwise rotation of the entire wheel assembly about axis 38 producing a lift-hand vehicle turn.

The angle of turn in either direction of the steer wheel 23 from a straight-ahead position will preferably effect a proportional differential wheel speed at the wheel assembly, but it will be appreciated that the characteristics of the control may be varied to suit requirements. The transmission system may be designed so that the pumps function at maximum displacement when the truck is moving straight-ahead with vehicular speed controlled by operator control solely of engine speed, in which event dirigible control is effected through a change in the displacement of one pump only with a consequent decrease in the speed of one dirigible wheel only, as is assumed in the previous examples given wherein the swash plate angle or displacement of one pump only was assumed to decrease upon steering of wheel 23.

On the other hand, the swash plate control of the pumps may be designed for normal straight-ahead operation at a selected angle intermediate neutral and full displacement so that steering control in one direction or the other will effect control movements of steering swash plates in opposite directions, whereby to effect an increase in rotational speed of one of the wheels 32 or 34 and a decrease in rotational speed of the other, all at a given engine speed. The latter condition would cause steering movement of the wheel assembly about axis 38 at a faster rate than is the case when the speed of one wheel only decreases from a normal maximum pump displacement. Of course, this condition results since a higher differential wheel speed produces a greater steering torque about axis 38 which in turn generates a faster turning rate of the wheel assembly.

Many variables and options in the design of such a system will become apparent to persons skilled in the art. They may be combined variously to produce a particularly desirable steering characteristic for different vehicles and for different applications of any such vehicle. For example, it may be found desirable on occasion to accommodate the sttering system in such a manner that one pump actually reverses its direction of flow under sharp angle steering conditions whereby to reverse drive the one wheel on the inside of a turn while the other wheel continues to drive in a forward direction.

It will be recognized that without feedback or follow-up control to coordinate the vehicle steering effect with the operator's steering wheel 23 that the operator would be required to perform certain steering wheel manipulations not usual in the steering of a vehicle. Such controls are desirable in ordinary usage, without which the wheel assembly will continue to turn about axis 38 with the steering wheel 23 set at any given steering angle until the latter is returned to a neutral position at which time the dirigible wheel assembly ceases to turn about axis 38 but will remain at its fthen fixed steering angle. To return to "straight-ahead" steering the operator then reverses the direction of steer to effect a counter steering torque about axis 38 by reversing the displacement effect on pumps 26 and 28, and therefore the rotation of the dirigible wheel assembly, which returns the vehicle to a condition at which it will again operate in straight-ahead movement. The operator, therefore, without feedback servo controls, or the like, will have a "jerk" type steer control which is ordinarily undesirable, and so it is contemplated that such a control should be combined with the present invention in most applications thereof.

It will be appreciated by those skilled in the art that numerous modifications are readily applicable within the concept of the invention, such as in the use of a single drive pump supplying, for example, a flow-divider which divides the pump output flow to the respective drive motors 40 and 42 through valving means controlled to bleed-off a certain volume of the hydraulic fluid flowing to one side of the flow-divider to effect the differential wheel speed above-described for steering purposes. It should also be appreciated that while the preferred embodiment as disclosed shows only a single pair of wheels mounted for rotation on a common shaft 54, that it is well within the scope of the invention to provide any desired and feasible number of such wheels mounted for rotation on such a common shaft, turntable, or other common rotatable mounting means. It will also be apparent that one or more such wheels or pairs or gangs of wheels in parallel may be also mounted in tandem combinations, each set of wheels in parallel being mounted from a common rotatable shaft such as 54, and each set of wheels in tandem therewith being mounted from a second common rotatable shaft, or the like. Various such combinations may be used for various modes of steering such as two-wheel Akermann, four-wheel radi-arc, or crab steering, for example.

Although I have illustrated and described with particularity only one embodiment of my invention, it will be understood by those skilled in the art that modifications may be made in the structure, form, and relative arrangement of parts without necessarily departing from the spirit and scope of the invention, such as is exemplified in certain alternative arrangements discussed above. Accordingly, it should be understood that I intend to cover by the appended claims all such modifications which fall within the scope of my invention.

I claim:

1. A wheel assembly for a vehicle comprising a pair of spaced drive-steer wheels mounted for dirigible movement about a common vertical axis and for rotational tractive movement about a common horizontal axis, said drive-steer wheel mounting including a generally inverted Y-shaped yoke, the upper leg of which supports the wheel assembly in the vehicle chassis and which is rotatable on said vertical axis, said pair of wheels being mounted from the lower spaced legs of said yoke for tractive movement about said horizontal axis, and means for causing said dirigible movement in order to steer the vehicle by driving one of said wheels at a rotational speed different than the driven speed of the other wheel, said latter means including a pair of drive motors also mounted from the respective lower spaced legs of said yoke.

2. A wheel assembly as claimed in claim 1 wherein said pair of drive motors are mounted coaxially with respective ones of said pair of wheels.

3. A wheel assembly as claimed in claim 2 wherein said respective pairs of motors and wheels are mounted in open spaced relation to each other from respective ones of said lower spaced legs of said yoke.

4. A wheel assembly as claimed in claim 3 wherein hydraulic drive and control means includes said motors and further includes hydraulic pump means connected independently to each motor and operator controlled to effect said differential rotative wheel speed, and fluid conduit means connecting the pump means and motors to said yoke.

5. A wheel assembly as claimed in claim 4 wherein the fluid conduit means is inside of and rotates as a part of the said yoke during dirigible movement of the wheels, the means connecting the pump means and motors including other non-rotative fluid conduit means connecting the pump means to the first-mentioned fluid conduits such that continuous communication exists between the rotatable and non-rotatable fluid conduits during rotation of the yoke about said vertical axis.

6. A wheel assembly as claimed in claim 1 wherein said respective pairs of motors and wheels are mounted in open spaced relation to each other from respective ones of said lower spaced legs of said yoke.

7. A wheel assembly as claimed in claim 1 wherein hydraulic drive and control means includes said motors and further includes variable displacement drive pump means controlled to effect such dirigible control of the wheels through speed control of said motors.

8. A wheel assembly as claimed in claim 1 wherein hydraulic drive and control means includes said motors and further includes means for driving each motor independently of the other motor as a function of vehicle operator steering control means, and hudraulic conduit means connecting each of said motors independently in said hydraulic drive and control means through said yoke.

* * * * *